Feb. 20, 1940.                K. PESTALOZZI                2,191,083
APPARATUS FOR THE ELECTRIC TRANSMISSION AT A DISTANCE OF ROTARY VELOCITIES
                         Filed Aug. 26, 1938
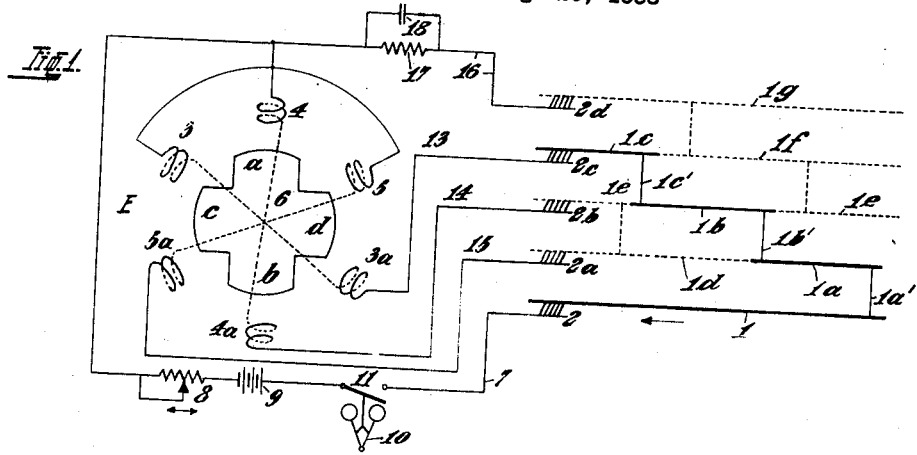
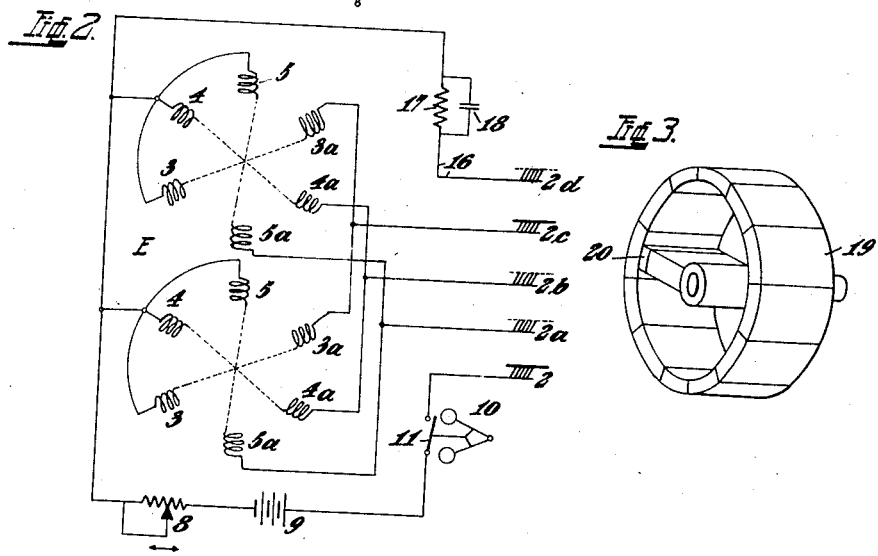
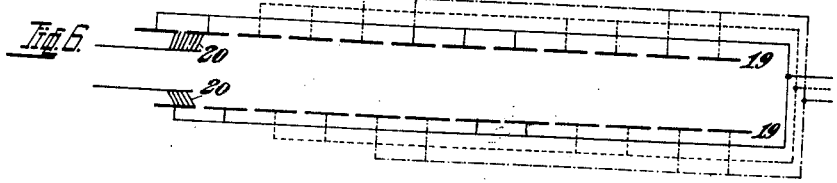
INVENTOR
Karl Pestalozzi
BY
his ATTORNEY.

Patented Feb. 20, 1940

2,191,083

UNITED STATES PATENT OFFICE 2,191,083

APPARATUS FOR THE ELECTRIC TRANSMISSION AT A DISTANCE OF ROTARY VELOCITIES

Karl Pestalozzi, Bern, Switzerland, assignor to Hasler A.-G. Werke für Telephonie und Prazisions-mechanik, Bern, Switzerland Application August 26, 1938, Serial No. 226,908
In Switzerland August 30, 1937

3 Claims. (Cl. 172—239)

The invention relates to an apparatus for the electrical transmission at a distance of rotary velocities and consists in that, in dependence on the angular velocity of a transmitter shaft, current impulses are so conducted, by lines fed with direct current, to a multi-pole magnet system having a rotary soft iron armature, that the latter is caused to rotate at a speed bearing a given relationship to the angular velocity of the transmitter shaft.

Figures 1 and 2 of the accompanying drawing show embodiments of the invention, illustrated diagrammatically.

Figures 3 to 6 show modifications of details.

Referring to Figure 1 of the drawing a transmitter shaft, not shown, the angular velocity of which is to be transmitted to a distant receiver E described hereinafter, is in rigid or positive connection of movement with a contact device in the form of a collector 1, 1a, 1b, 1c shown in developed form and a plurality of brushes 2, 2a, 2b, 2c. The receiver illustrated consists of a magnet system 3, 3a, 4, 4a, 5, 5a possessing three pairs of poles and excited by the incoming current impulses, and a rotary laminated soft iron armature 6 with two pairs of poles a, b, c, d. The coils 3, 4, 5 by means of a line 7 in which are inserted a regulatable resistance 8, a source of direct current 9 and a switch 11 automatically opened by a regulator 10 when the transmitter is stationary, are connected with the brush 2 lying against a closed slip-ring. On the other hand, the coils 3a, 4a, 5a are connected by lines 13, 14 and 15 respectively with the brushes 2a, 2b and 2c respectively. The collector segments 1a, 1b and 1c are connected together and to the ring 1, by lines 1a', 1b' and 1c'. As in the case of an armature having only one pair of poles, the starting torque would be only small in consequence of the relatively long path of the line of force, in order to obtain a torque as uniform as possible, an armature is selected the number of pairs of poles of which is greater than 1 and smaller than the number of stator pole pairs. During the rotation of the transmitter in the direction of the arrow, electric current impulses are supplied to the three pole pairs 3, 3a, 4, 4a, 5, 5a by way of the lines 13, 14, 15. At each impulse the magnetic axis turns by 60° in a clockwise direction. The armature 6 also turns, but only 30° at each impulse and in the opposite direction. In order to obtain a rotation of the receiver, which is as uniform as possible, both pole pairs, during the change-over from one pair of poles to the next, are simultaneously under current for a short time. To this end, the collector segments are mutually overlapped. The same object may also be attained by suitable dimensioning of the thickness of the brushes. In the case of a collector having only one segment for each brush 2a, 2b, 2c, each pair of poles of the receiver stator receives one impulse per rotation of the transmitter shaft. If higher rotary speeds of the receiver are desired, or if the receiver speed is to be higher relatively to the transmitter, the number of collector segments can be correspondingly increased, thus also increasing the number of impulses per rotation of the transmitter shaft. Modifications of the transmitter serving this purpose are described hereinafter.

The current capacity of the receiver is strongly dependent on the impulse sequence speed, in consequence of the action of the self-induction in the magnetic coils. The proportions of the windings must be such that sufficient torque is still developed at the maximum impulse sequence speed to operate an apparatus, such as a speedometer, coupled with the receiver and to be driven thereby. At a low speed the current therefore rises in an undesirable degree. The consequences of this would be a heavy consumption of current, high contact loads and unsteady or non-uniform running of the receiver, unless means were provided to remedy this inconvenience. As already indicated, a variable resistance 8 is inserted in the circuit of the source of current 9.

In order to prevent the burning of the contacts of the transmitter, the following means are provided to extinguish sparks. On the collector of the transmitter are disposed segments 1d, 1e, 1f adjacent to but insulated from the segments 1a, 1b, 1c and these are connected together and with a closed ring 1g, against which lies a brush 2d which is connected to the coils 3, 4, 5 by means of a short-circuit line 16 with inserted ohmic resistance 17 and condenser 18 lying parallel thereto. By means of the brushes 2a, 2b and 2c the windings of the magnet pole pairs of the receiver are practically short-circuited before the contacts of the circuits are opened, thus preventing the formation of sparks.

The centrifugal regulator 10 which is driven by the transmitter automatically opens the switch 11 when the transmitter is stationary, or shortly before it comes to rest, thus avoiding unnecessary current consumption and destruction of the armatures and source of current.

Figure 2 of the accompanying drawing shows an apparatus having one transmitter and two receivers connected in parallel. Like reference numerals denote like or equivalent parts to those shown in Figure 1 so that a separate description of the construction and mode of operation of this embodiment of the device is unnecessary.

Instead of a rotating collector, a stationary collector 19 (Figure 3) having a rotary brush 20 may be employed. This construction of the contact maker permits the switching over thereof for different numbers of impulses per rotation and pair of poles of the receiver. Figures 4 and 5 show by way of example, in the case of a collector having 12 segments, a wiring arrangement for the latter for four and two impulses, respectively, per rotation of the brush, either four segments being uniformly distributed singly over the periphery in each case, or two groups of two directly following segments being connected to a common pole pair line. In the case of only one impulse per revolution, four successive segments would have to be connected to one line.

In order to obtain an overlapping of the segments the segment ring of the collector may consist of two halves disposed side by side and mutually staggered in the peripheral direction. Figure 6 shows such an arrangement of the segments for two impulses per revolution.

As is apparent from the foregoing, the speed of the receiver or of the apparatus driven thereby, in the case of the device hereindescribed, depends plainly on the impulse sequence speed, and the impulses are so generated by the transmitter that the impulse sequence speed depends on the angular velocity of the transmitter shaft. The effect of this is that the angular velocity of the receiver bears a fixed relationship to that of the transmitter shaft. This relationship is not affected by the properties of the lines in consequence of the use of impulses.

The herein described and illustrated transmission device thus works just as if the receiver were mechanically in rigid or positive connection of movement with the transmitter.

What I claim is:

1. In a system for the electric transmission of rotary velocities, the combination of a transmitter including a rotary contact element and a plurality of fixed contacts arranged for successive cooperation with said rotary element at different angular positions of the latter, a receiver comprising a stator having a plurality of pairs of field magnets electrically connected with said fixed contacts, respectively, and a soft iron rotor, a source of direct current, a variable resistance, a transmission circuit containing said rotary contact element, source of current and variable resistance in series with each of said magnet pairs, the latter being arranged parallel to each other, and a spark extinguishing circuit in shunt with said transmission circuit.

2. An electric transmission system, as claimed in claim 1, comprising means in said transmission circuit in series with said rotary contact element for opening said circuit when the transmitter is at rest.

3. An electric transmission system, as claimed in claim 1, in which said rotary contact element is a brush and said fixed contacts are arranged to form a stationary collector having two relatively displaced segment rings.

KARL PESTALOZZI.